UNITED STATES PATENT OFFICE.

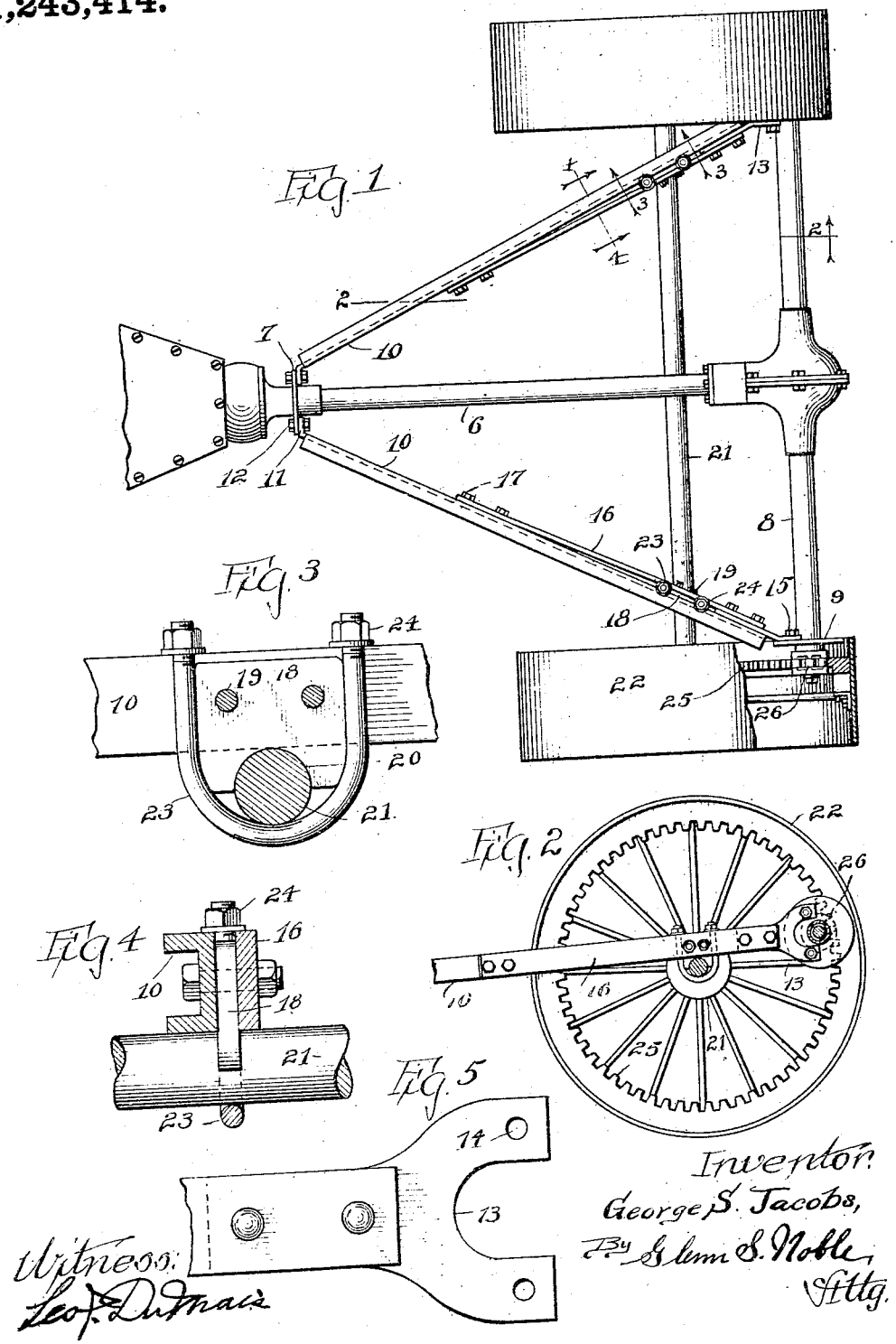

GEORGE S. JACOBS, OF PONTIAC, MICHIGAN, ASSIGNOR TO THE GENEVA TRACTOR COMPANY, OF GENEVA, OHIO.

TRACTOR ATTACHMENT FOR AUTOMOBILES.

1,243,414.   Specification of Letters Patent.   Patented Oct. 16, 1917.

Application filed March 13, 1917.   Serial No. 154,455.

*To all whom it may concern:*

Be it known that I, GEORGE S. JACOBS, a citizen of the United States, residing at Pontiac, in the county of Oakland and State of Michigan, have invented certain new and useful Improvements in Tractor Attachments for Automobiles, of which the following is a specification.

The present invention relates to an attachment or apparatus whereby an ordinary passenger automobile such as are usually geared for comparatively fast speed, may be easily and cheaply converted into a tractor geared for comparatively slow speed and adapted for pulling loads such as plows, wagons or the like.

The objects of the present invention are to provide a simple and efficient device for changing an ordinary light passenger automobile into a tractor; to provide a tractor attachment for automobiles, which may be quickly and easily applied without making any considerable changes in the structure of the automobile; to provide an attachment which may be readily applied for changing a light automobile into a tractor, and may then be readily disconnected for changing the automobile back to its original condition; and to provide such advantages and such features of construction as will appear more fully from the following description.

In the accompanying drawings illustrating this invention:

Figure 1 is a plan view showing my attachment in position, only such parts of the automobile being shown as are necessary for illustrative purposes;

Fig. 2 is a longitudinal sectional view taken on the line 2—2 of Fig. 1;

Figs. 3 and 4 are details on an enlarged scale, showing the arrangement for attaching the tractor axle to the frame; and Fig. 5 is a detail of one end of the torsion rod or frame member.

While this invention is applicable to various types and makes of automobiles, it is especially applicable to the Ford automobile, and the illustrations represent in a conventional manner the rear driving system of this car. As shown in these drawings, 6 represents the torsion tube for the propeller shaft, this tube being provided at the front end with a flange 7, and being connected at the opposite end with the rear axle housing 8. The ends of the rear axle housing are provided with flanges 9. The usual light torsion rods may be removed, and in their place or in addition thereto I provide strong substantial rods or braces 10, which will serve not only as torsion rods, but will also serve as frame members for connecting the axle for the traction wheels to the automobile. The combined torsion rods and frame members 10 are preferably made of channel bars. The flanges of these bars are cut away for a short distance at the front end, and the web bent inwardly as indicated at 11, to provide means for attaching the brace to the flange 7. This attachment is made by means of the usual bolts 12. The opposite ends of the braces 10 are provided with forked extensions 13 having holes 14 for receiving the bolts 15, which secure them to the flanges 9 of the rear axle housing. Strengthening plates or bars 16 are secured to the inner faces of the rods or braces 10, and held in position by means of bolts, rivets or the like 17. The rear ends of these bars rest on the ends of the extensions 13, so that spaces are left between the bars and the braces. Saddles or positioning members 18 are inserted between the braces 10 and plates 16, and held in position by means of bolts 19. These saddles have grooves 20 which fit over the axle 21, which is carried by the traction wheels 22. The axle is further held in position by means of U-bolts 23, which extend around the axle and project up between the braces 10 and bars 16, and are provided with nuts 24 and washers, for tightening them so as to draw the axle tight against the lower edges of the braces and bars.

The traction wheels 22 may be made in any suitable form, and are provided with internal gears 25. The rear wheels of the automobile are removed and gears 26 are secured to the ends of the axle shafts in place of the removed wheels. These gears may be of any suitable form, but are preferably of the roller pinion type. They engage with the internal gears 25 of the traction wheels.

When an automobile is supplied with my attachment in the manner described, it will be seen that the wheel base is somewhat shortened, which is a desirable feature for a tractor for pulling plows or other agricultural implements. Furthermore, the pinions 26 and gears 25 may be so proportioned that the speed of the vehicle may be reduced and the tractive or pulling power increased to any extent desired. After the heavy braces or frame members 10 have been applied in the place of the original torsion rods, they will not need to be removed when changing the vehicle from a tractor back to its original conditions, as the axle 21 may be removed by taking out the U-bolts, and the gears or pinions 26 may then be removed and the original wheels replaced on the rear axle. In this manner I provide an attachment which may be readily applied, and one by means of which a light passenger automobile may be readily converted into a tractor and then may be readily reconverted back without any material changes or disarrangement of the automobile frame, and the tractor wheels will have a relatively narrow tread; that is, substantially the same as the automobile wheels.

Having thus described my invention, which, however, I do not wish to limit to the details of construction or arrangement of parts hereinbefore described, except as specified in the following claims, what I claim and desire to secure by Letters Patent is:

1. A tractor attachment for automobiles, comprising strong frame members inserted in the place of the usual torsion rods and extending from the front end of the torsion tube to the ends of the rear axle of the automobile, an axle secured to said members, wheels mounted on said axle, and means comprising reduction gearing, for driving said wheels from the rear axle of the automobile, the rear wheels having been removed and the weight being supported on said last-named wheels.

2. A tractor attachment for automobiles, comprising two frame members which are adapted to be arranged in the place of the usual torsion rods and extending from the front end of the torsion tube to the ends of the rear axle of the automobile, an axle secured to said frame members, traction wheels mounted on said axle, gears connected with said traction wheels, and gears adapted to be attached to the rear axle of the automobile in the place of the automobile wheels, for driving the gears on the traction wheels.

3. In a device of the character set forth, the combination of two channel bars, means for connecting said bars to the front end of the torsion tube, and to the ends of the rear axle housing, reinforcing plates spaced from said channel bars, saddles inserted between the plates and the bars, an axle engaging with said saddles, U-bolts for securing the axle to the channel bars at a point in front of the rear axle of the automobile, traction wheels mounted on said axle, internal gears in said wheels, and pinions engaging with said gears, said pinions being attached to the rear axle of the automobile in the place of the automobile wheels.

4. The combination with an automobile chassis, of heavy bars or frame members connected at their front ends with the front end of the torsion tube and at their rear ends with the ends of the housing of the rear axle of the automobile, a relatively heavy axle secured to said frame members, in advance of the rear axle of the automobile, means for detachably securing said axle to the frame members, traction wheels for said axle, and gearing for driving the traction wheels from the rear axle of the automobile, said gearing including pinions attached in the place of the automobile wheels.

GEORGE S. JACOBS.